Apr. 24, 1923.
J. E. MULLEN
1,452,697
AGRICULTURAL MACHINE
Filed Nov. 21, 1919
2 Sheets-Sheet 1
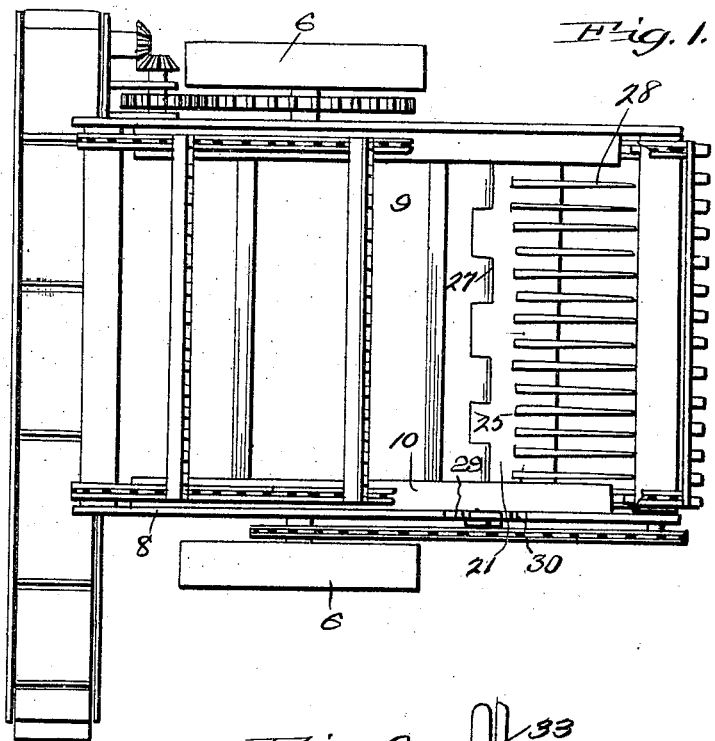
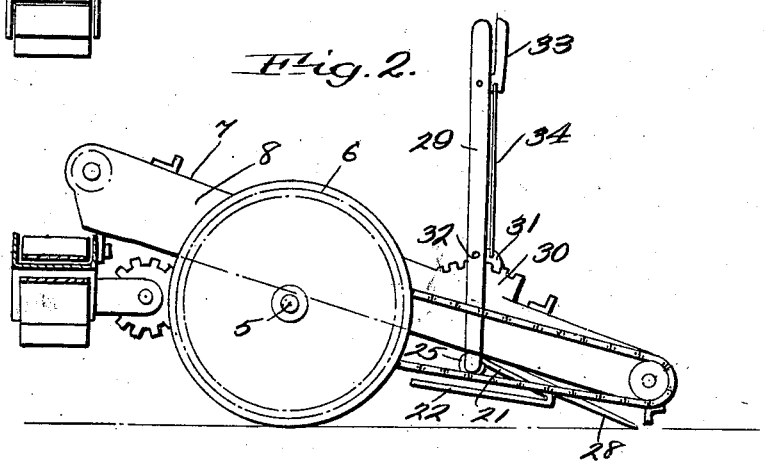
Inventor
John E Mullen Apr. 24, 1923.  
J. E. MULLEN  
AGRICULTURAL MACHINE  
Filed Nov. 21, 1919  
1,452,697  
2 Sheets-Sheet 2

Inventor  
John E Mullen

Patented Apr. 24, 1923.

1,452,697

UNITED STATES PATENT OFFICE.

JOHN E. MULLEN, OF NEW DULUTH, MINNESOTA.

AGRICULTURAL MACHINE.

Application filed November 21, 1919. Serial No. 339,567.

*To all whom it may concern:*

Be it known that I, JOHN E. MULLEN, a citizen of the United States, residing at New Duluth, in the county of St. Louis and State of Minnesota, have invented certain new and useful Improvements in an Agricultural Machine, of which the following is a specification.

My invention relates to improvements in machines for gathering stones, potatoes, beans, and other such articles, and has for its main object to produce a machine of this character that is highly efficient in operation, reliable in such operation, and inexpensive to manufacture.

A further object of the invention lies in the provision of a combined picking and scraping element pivotally and adjustably associated with the lower end of the frame.

Other objects and advantages of the invention will be apparent during the course of the following description.

In the accompanying drawings forming a part of this specification and in which like numerals are employed to designate like parts throughout the same, Figure 1, is a top or plan view of my machine showing the structure in detail;

Figure 2, is a side elevation of the machine;

Figure 3:
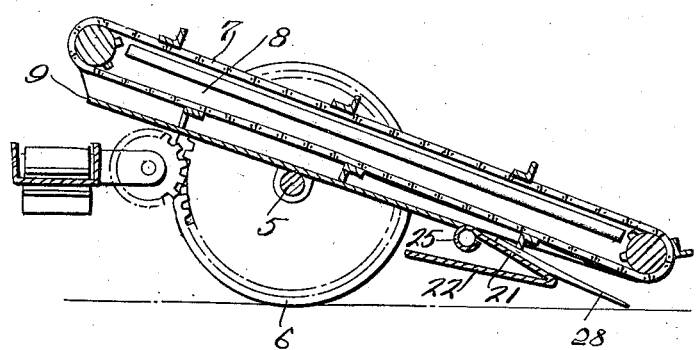
Figure 3, is a sectional side elevation.
Figure 4:
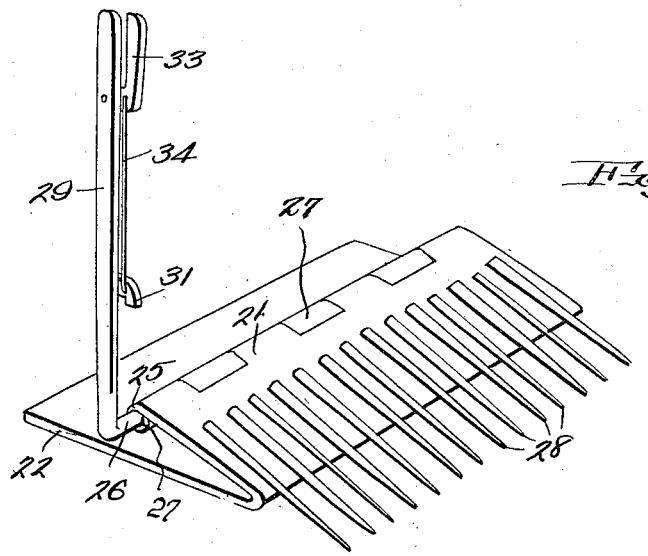
Figure 4, is a detail perspective view of the combined picking and scraping element.

In the drawings, wherein for the purpose of illustration, I have shown a preferred embodiment of my invention, the numeral 5 designates the axle or shaft of the machine having journaled on each end a traction wheel 6. Rigidly mounted upon the axle 5 in an inclined position is a frame 7, which consists of the side pieces 8 and the bottom 9, said sides extending a substantial distance beyond the lower edge of the bottom.

The combined picking and scraping element is formed from a plate bent so that the upper portion 21 is at a substantially acute angle to the lower portion 22, said lower portion constituting the scraping element. The longitudinal free edge of the upper portion is recessed at intervals throughout its length forming projections 25 that are rolled about the longitudinally extending bar 26 being rigidly attached thereto. This element is connected to the lower edge of the bottom 9 that has its edge recessed at alternate intervals, so as to form an interlocking connection between the said element and bottom. The projections 27 formed by recessing the lower edge of the bottom are coiled about the bar 26 forming bearings therefor. The surface of the upper portion is equipped with a plurality of tapering shaped teeth 28 that extend a substantial distance beyond the end of the plate. The outer end of the rod 26 is bent upwardly at a right angle, extending along the outer side 8 of the frame forming a handle 29. Formed integral with the side of the frame and adjacent the handle 29 is an arcuate shaped toothed segment 30 that regulates the shifting of the handle, through the medium of a pawl 31 which is pivotally connected to the handle as at 32. A lever 33 is pivotally connected to the upper end of the handle and controls the pawl 31 through the connecting rod 34. Thus it is obvious that when the picking element is in engagement with the ground the scraping plate will be elevated in a substantially horizontal position. When in this position the handle 29 will be in a substantially vertical position and by releasing the pawl 31 and drawing the handle rearwardly, the picking element will be elevated and the scraping plate lowered into engagement with the ground.

In operation, the machine may be either drawn by horses or may be attached to a tractor or any other means that will impart movement to the traction wheels 6 upon which the machine is supported. In the gathering of the articles it is obvious the ground will be dug up to a certain extent, and therefore, a scraping element is provided which is brought into operation upon elevating the picking element and which will grade the ground after the stones are gathered. It will be noted that the sides of the frame at the lower end extend a substantial distance beyond the lower edge of the bottom, thus providing guide means for the articles being gathered. From the foregoing it can be readily seen that a novel machine has been constructed including several novel features that increase the efficiency and practicability to the extent that it accomplishes the result in a more reliable and satisfactory manner.

It is to be understood that the form of my invention herewith shown and described, is to be taken as a preferred example of the same, and that certain changes in the shape, size, and arrangement of parts may be resorted to without departing from the spirit of the invention or the scope of the subjoined claims.

Having thus fully described my invention, I claim:—

1. The combination with a machine of the character described, of a combined picking and scraping element capable of selective engagement with the ground.

2. In a machine of the character described, the combination of a wheeled frame, a combined picking and scraping element associated with the frame, said element being capable of selective engagement with the ground.

3. In a machine of the character described, the combination of a wheeled frame, a picking element pivotally joined at the bottom of said frame, a plate bent rearwardly from the picker forming a scraper, substantially as described.

4. In a machine of the character described, the combination of a wheeled frame, a plate pivotally joined to the frame, bent to provide a scraping and picking element, and means for moving said elements selectively into engagement with the ground.

5. In a machine of the character described, the combination of a wheeled frame, a plate pivotally joined to the frame, said plate being bent so its upper portion is at substantially an acute angle to the lower portion, a plurality of teeth extending from the upper portion forming a picking element, said lower portion extending rearwardly to provide a scraper, and means for moving the picker or scraper selectively into engagement with the ground.

6. A device of the class described including a frame supported upon a wheeled axle in an inclined position, the bottom of said frame having at its lower end a series of recesses, and a combined picking and scraping element having its upper edge recessed at intervals to form interlocking tongues for connection with the correspondingly shaped recesses formed in the lower edge of the bottom.

In testimony whereof, I have affixed my signature in the presence of two witnesses.

JOHN E. MULLEN.

Witnesses:
W. E. GRADY,
H. O. BROWN.